United States Patent [19]

Leblanc et al.

[11] 4,378,749
[45] Apr. 5, 1983

[54] ROTATABLE TIRE FOR BARGE BUMPER

[75] Inventors: Raymond F. Leblanc, North Canton; William T. Cummins, Mogadore, both of Ohio

[73] Assignee: Teledyne Industries, Inc., Los Angeles, Calif.

[21] Appl. No.: 259,260

[22] Filed: Apr. 30, 1981

[51] Int. Cl.³ .............................................. B63B 59/02
[52] U.S. Cl. .................... 114/220; 114/219; 152/310; 267/140.3; 405/212; 293/109
[58] Field of Search ....................... 152/310, 349, 313; 256/13.1; 267/140.3, 152; 114/219, 220; 293/109, 125, 17–19; 405/211–216

[56] References Cited

U.S. PATENT DOCUMENTS

| | | | |
|---|---|---|---|
| Re. 29,890 | 1/1979 | Gomberg | 152/310 |
| 867,600 | 10/1907 | Ray | 152/310 |
| 2,237,182 | 4/1941 | Iknayan | 152/313 |
| 2,562,957 | 8/1951 | Sipkin | 114/219 |
| 2,952,979 | 9/1960 | Rolando | 114/220 |
| 3,574,317 | 4/1971 | Brewer | 152/313 |
| 3,605,848 | 9/1971 | Lombardi | 152/310 |
| 3,866,652 | 2/1975 | Ahmad | 152/310 |
| 4,005,672 | 2/1977 | Files | 114/220 |
| 4,098,211 | 7/1978 | Files | 114/220 |
| 4,134,610 | 1/1979 | Lindewall | 114/219 |

*Primary Examiner*—Trygve M. Blix
*Assistant Examiner*—D. W. Keen
*Attorney, Agent, or Firm*—Frease & Bishop

[57] ABSTRACT

A rotatable energy-absorbing sleeve unit for ship bumpers including a rim-free vehicle rubber-containing tire carcass filled with elastomeric foam. The elastomeric foam may be either polyurethane or rubber foam. The tire may be an auto or truck new, used, retreaded or blemished tire.

3 Claims, 5 Drawing Figures

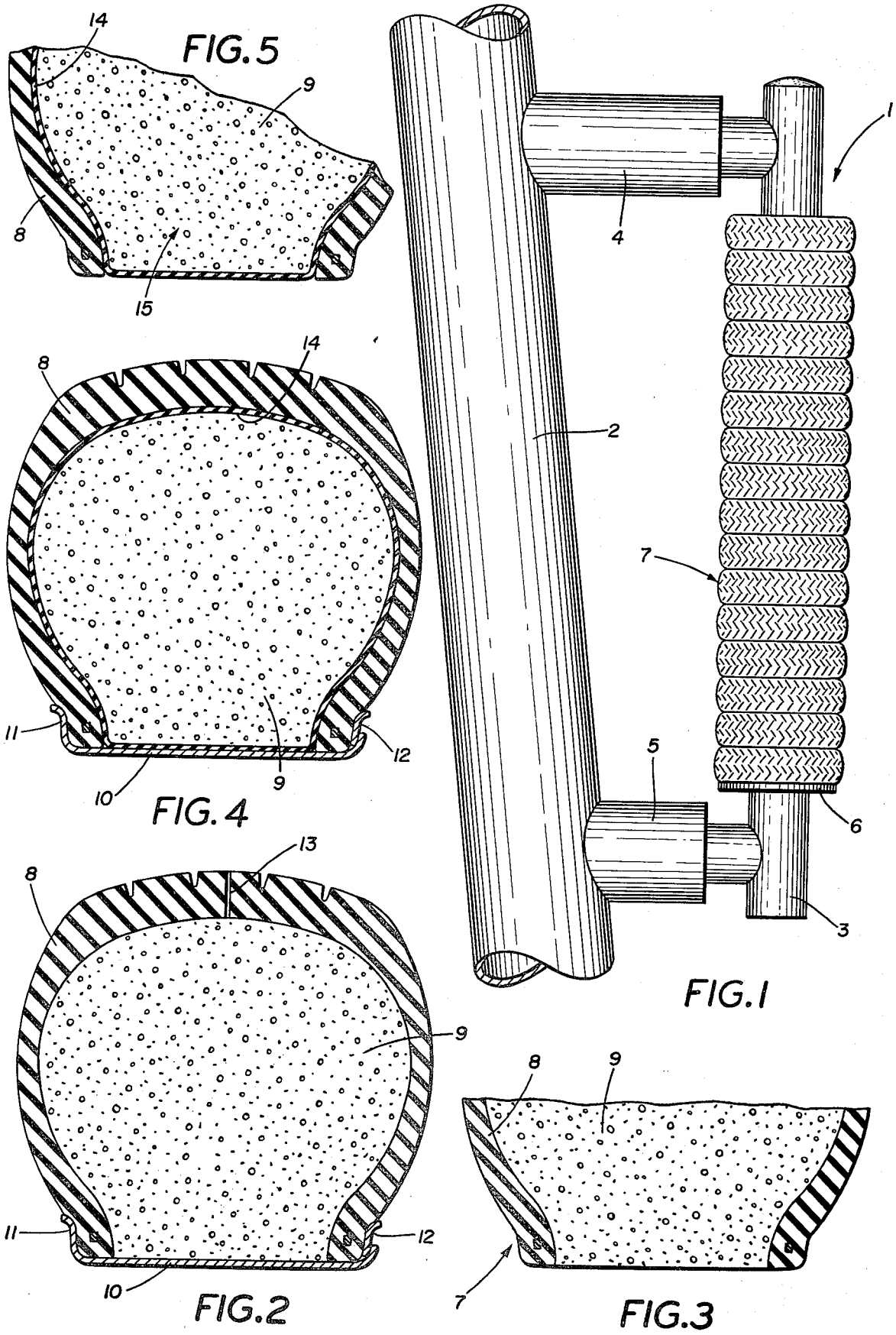

ROTATABLE TIRE FOR BARGE BUMPER

BACKGROUND OF THE INVENTION

1. Field of the Invention

The invention relates to an energy-absorbing bumper or fender for protecting ships, barges or other floating vessels, or docking structure for such vessels, from damage when such vessels are tied up at or docking at such docking structure, for example at offshore oil rig structures or barge loading platforms. More particularly the invention relates to an improved tire device to be stacked rotatably on an upright metal bumper pipe mounted on an offshore rig structure and the like. Finally, the invention relates to a cured-in-tire elastomeric polyurethane or rubber foam-filled vehicle tire used as a rotatable energy-absorbing ring or sleeve for ship bumpers.

2. Description of the Prior Art

Many different types and kinds of energy-absorbing bumper devices are known in the prior art for protecting ships or other floating vessels and the structures at which such vessels are docked from damage due to relative movement between the vessel and the dock structure. Particularly in offshore oil rig structure installations, bumpers formed by an upright metal pipe mounted on a leg or other structural member of the rig surrounded by a stack of rubber rings, tires or the like have been used. Other forms of fenders using tires as the energy-absorbing device either unfilled or filled have also been used. Examples of such prior art structures are shown in U.S. Pat. Nos. 2,562,957, 2,952,979 and 4,005,672.

Used auto and truck tires comprise a relatively inexpensive source of energy-absorbing elastomeric material for bumpers but problems have arisen in their use stacked on an upright metal bumper pipe including as many as twenty or more tires which each may have an axial thickness of from nine to twelve inches.

Such used tires, when hollow, may be readily damaged or ripped from the bumper pipe when a rib of a ship docked at a structure wedges between adjacent stacked bumper tires and moves up and down as a result of wave action. Unsuccessful attempts have been made to provide some filling material in a tire cavity, such as suggested in the boat fender of U.S. Pat. No. 2,952,979, when used vehicle tires are available or used stacked on a vertical rig structure bumper to prevent collapse of the tire carcass walls when forcefully engaged by a ship moving relative to the bumper.

Vehicle tires, frequently in recent years, for off-the-road vehicles of the pneumatic tire shape and type have been filled when mounted on a rim completely with various resilient or void-free elastomeric materials to prevent the tires from going flat, by being punctured or torn by sharp objects encountered when a vehicle equipped with such tires travels in areas such as metal scrap yards. For example, see U.S. Pat. Nos. 867,600, 3,866,652 and Re. 29,890. Such rim-mounted filled vehicle tires for vehicle use, however, are not feasible for use in the assembly of ship bumpers for a variety of reasons.

First of all, the cost of such filled vehicle tires is economically prohibitive for use stacked in large numbers as a part of a bumper assembly.

Next, the weight of the metal rims of such filled vehicle tires stacked in large numbers as a part of a ship bumper assembly cannot be tolerated. Such weight would add considerably to the structural strength requirements of the rig structure itself.

Further, the weight of the resilient or void-free elastomeric material filling the rim-mounted vehicle tires also substantially exceeds the preferred limits of weight for rotatable energy-absorbing bumper ring members.

Accordingly, a need has long existed for a rotatable energy-absorbing ring or sleeve unit for ship bumpers composed of relatively inexpensive vehicle tires free of rims and completely filled with an extremely lightweight energy-absorbing strong elastomeric foam material such as polyurethane foam or rubber foam.

SUMMARY OF THE INVENTION

Objectives of the invention include providing a new rotatable energy-absorbing ring or sleeve structure for ship bumpers composed of a rim-free pneumatic type rubber-containing vehicle tire carcass filled with a lightweight elastomeric foam material cured within the tire cavity; providing such a sleeve structure in which the elastomeric material is polyurethane or rubber foam; and providing a new rotatable energy-absorbing ring or sleeve structure for assembly as a part of a ship bumper which achieves the stated objectives in a reliable, efficient and readily used manner, and which solves problems and satisfies needs that long have existed in connection with ship bumper devices for off-shore oil rig structures.

These and other objectives and advantages may be obtained by the sleeve construction, the general nature of which is set forth below, and which may be stated as a rotatable energy-absorbing ringlike sleeve unit for stacked assembly on an upright pipe member of a ship bumper comprising a rim-free pneumatic-type rubber-containing vehicle tire carcass, and a cured-within-the carcass lightweight, elastomeric foam filling in the carcass.

BRIEF DESCRIPTION OF THE DRAWING

Preferred embodiments of the invention—illustrative of the best mode in which applicants have contemplated applying the principles—are set forth in the following description and shown in the drawing and are particularly and distinctly pointed out and set forth in the appended claims.

FIG. 1 is a schematic diagrammatic view of a typical oil rig bumper mounted on an offshore oil rig or platform structure with the upright bumper pipe surrounded by a stack of improved polyurethane foam-filled rim-free pneumatic type vehicle tire energy-absorbing bumper sleeves;

FIG. 2 is a diagrammatic sectional view of an improved polyurethane or rubber foam-filled tire having its foam filling cured therein;

FIG. 3 is a fragmentary sectional view similar to a portion of FIG. 2 showing the rim-free tire after curing and removal from the ring form used for filling and curing the polyurethane or rubber foam therein;

FIG. 4 is a view similar to FIG. 2 but showing a modified form of foam filled tire, the foam being within a typical pneumatic tire rubber inner tube within the tire carcass; and FIG. 5 is a view similar to FIG. 3 showing the rim-free tire with an inner tube therein filled with foam to be used as an energy-absorbing bumper sleeve for boat bumpers.

DESCRIPTION OF THE PREFERRED EMBODIMENTS

First Embodiment

A typical bumper generally indicated at 1 is shown in FIG. 1 mounted on the leg 2 of a typical oil rig offshore structure. The bumper 1 may be a vertical member 3 supported by upper and lower shock cells 4 and 5 which are mounted on the leg 1. Any usual detachable connection (not shown) may be provided between the shock cells 4 and 5 and the leg 2 or between the shock cells 4 and 5 and the upright bumper pipe vertical member 3. The member 3 typically may be a cylindrical metal pipe.

A support flange 6 preferably is mounted on the pipe member 3 adjacent the lower shock cell 5 to support a stack of energy-absorbing sleeve units 7 rotatably telescoped over the pipe member 3 and extending solely between the shock cells 4 and 5 as shown in FIG. 1.

In accordance with the invention, each rotatable sleeve unit 7 consists of a rim-free pneumatic-type rubber-containing vehicle tire carcass 8 and a cured-within-the-carcass filling 9 as shown in FIG. 3.

Further, the filling 9 is a lightweight elastomeric polyurethane or rubber foam. The sleeve unit 7 is rim-free and is composed of only two components, the tire carcass 8 and the foam filling 9, and thus provides an exceptionally low cost strong energy-absorbing rotatable sleeve for being stacked as a part of a ship bumper assembly 1.

The foam filling resists collapse of the walls of adjacent tire carcasses, when a number of units are stacked as a part of the bumper assembly, if a ship's rib attempts to enter between adjacent sleeve units when contacting the bumper, thus avoiding sleeve destruction and ripping characteristic of prior devices utilizing unfilled vehicle tires as rotatable rings stacked on the upright pipe of a ship bumper.

The vehicle tire used to form the sleeve unit 7 may be any type of auto or truck pneumatic type tire, either new or used or retreaded or blemished rubber-containing tire. Although, economically, used vehicle tires may be the least expensive source of the tire component of the new sleeve unit 7, retreaded and blemished tires may be relatively inexpensive. Even new tires of types made in some foreign countries which satisfy only minimum requirements for use may also be a source of rubber-containing tire carcasses.

The improved foam filled sleeve unit 7 may be made by placing a vehicle tire on an annular metal form 10 (FIG. 2) having an annular flange 11 and a split ring flange 12 detachably assembled with the form 10 to hold the tire beads in position during filling and curing of the elastomeric foam material within the tire carcass cavity.

The liquid components pumped into the tire carcass to cure therein and form a polyurethane foam may be the materials identified by the trademark "MONOFILL" sold by Teledyne Monarch Rubber division of Teledyne Industries, Inc., Hartville, Ohio.

These liquid components are pumped into the tire carcass cavity in any desired manner such as through a needle inserted in an opening 13 in the tire carcass, a foaming agent being added to the liquid polyurethane forming components. The foaming agent may be water in proportion by weight of about 10% of the combined polyurethane forming liquid components and water. Other typical foaming agents such as Freon may be used.

The liquid components which are combined with a foaming agent to form a polyurethane foam may be those such as described in U.S. Pat. No. Re. 29,890.

After the liquid components and foaming agent have been pumped into the carcass cavity of the used tire 8, the materials cure within the carcass cavity to form the polyurethane foam filling 9 adhering to the rubber-containing tire carcass 8. When the elastomeric foam has fully cured, the sleeve unit is removed from the form 10 by first removing the split ring 12.

The polyurethane-foam filling 9 may also be made by using a frothing agent such as nitrogen gas introduced into a mixture of the liquid components discussed above and whipped into a blended liquid and introduced into the tire carcass 8 in the manner described.

Further, rubber foam may be used instead of the polyurethane-foam to provide the elastomeric foam filling. Such rubber foam may be made from green or uncured rubber stock to which a chemical is added that breaks down at normal curing temperatures to release gas which provides the foam characteristics. Such chemical may be Celogen AZ, a product of Uniroyal Chemical division of Uniroyal, Inc. Such materials may be introduced into the carcass 8 and cured therein in the usual manner for curing the rubber stock utilized.

Second Embodiment

As a further modification of the new sleeve unit construction of a pneumatic type vehicle tire filled with elastomeric foam, a carcass 8 (FIG. 4) may have a typical rubber inner tube 14 inserted therein and placed on a form 10 as previously described in connection with FIG. 2. The elastomeric polyurethane-foam forming components or elastomeric rubber foam forming components, as described, then are introduced into the inner tube and cured therein, after which the foam filled tire 8 may be removed from the form 10 to provide the finished carcass-inner-tube-foam filled sleeve unit 15 (FIG. 5).

IN GENERAL

Accordingly, the improved sleeve unit provides a distortion-resisting energy-absorbing rotatable sleeve, a large number or series of which may be stacked directly on one another surrounding a metal bumper pipe to provide a damage-resistant ship bumper, thereby achieving the objectives of the invention and satisfying a need that has long existed in the art.

In the foregoing description, certain terms have been used for brevity, clearness and understanding; but no unnecessary limitations are to be implied beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the new sleeve unit may be manufactured, constructed and functions, and the advantageous, new and useful results obtained; the new and useful structures, devices, components, elements, arrangements, and parts are set forth in the appended claims.

We claim:

1. In a bumper for an offshore oil rig or barge loading structure of the type in which an upright metal bumper pipe is mounted on upper and lower shock cells in turn mounted on a leg of such structure, and in which a stack of rubber rings normally surrounds said upright metal bumper pipe between said shock cells; wherein the improvement consists of a series of rotatable energy-absorbing, distortion-resisting, ringlike sleeves surrounding said upright metal bumper pipe stacked directly on one another and extending solely between said shock cells; each ringlike sleeve consisting of a rim-free pneumatic-type rubber-containing vehicle tire carcass, and a cured-within-the-carcass lightweight elastomeric foam filling in the carcass; and there being a rubber inner tube located within the carcass; the elastomeric foam filling being located within the rubber inner tube; and the foam filling being cured within said rubber inner tube located within the carcass.

2. The sleeves as defined in claim 1 in which the elastomeric foam filling cured within said inner tube and carcass is polyurethane foam.

3. The sleeves as defined in claim 1 in which the elastomeric foam filling cured within said inner tube and carcass is rubber foam.

* * * * *